(12) United States Patent
Keirse et al.

(10) Patent No.: US 8,381,683 B2
(45) Date of Patent: Feb. 26, 2013

(54) DISPENSER TRAY FOR FEED DISPENSER

(75) Inventors: Philippe Hyppoliet Pia Maria Keirse, Maldegem (BE); Koen Debruyne, Ursel (BE); Sofie Els Johanna van Zele, Knessel Are (BE)

(73) Assignee: Roxell N.V., Maldegem (BE)

( * ) Notice: Subject to any disclaimer, the term of this patent is extended or adjusted under 35 U.S.C. 154(b) by 228 days.

(21) Appl. No.: 12/158,531

(22) PCT Filed: Dec. 21, 2006

(86) PCT No.: PCT/IB2006/003743
§ 371 (c)(1),
(2), (4) Date: Aug. 4, 2008

(87) PCT Pub. No.: WO2007/072203
PCT Pub. Date: Jun. 28, 2007

(65) Prior Publication Data
US 2009/0000555 A1    Jan. 1, 2009

(30) Foreign Application Priority Data

Dec. 22, 2005 (NL) .................................... 1030743

(51) Int. Cl.
*A01K 39/01* (2006.01)
(52) U.S. Cl. ........................................ 119/52.4; 119/53
(58) Field of Classification Search ................. 119/52.1, 119/52.4, 53, 61.1, 61.5, 70; *A01K 39/00, A01K 39/01, 39/012, 39/014, 61/02, 1/10, A01K 5/00*
See application file for complete search history.

(56) References Cited

U.S. PATENT DOCUMENTS

| 1,593,705 | A |   | 7/1926  | Nebergall |
|-----------|---|---|---------|-----------|
| 3,388,690 | A | * | 6/1968  | Hostetler ........................ 119/53 |
| 4,398,880 | A | * | 8/1983  | Seiling ........................... 425/439 |
| D321,572  | S | * | 11/1991 | Laden ........................... D30/129 |
| 5,497,730 | A | * | 3/1996  | van Daele et al. .............. 119/53 |
| 5,762,021 | A | * | 6/1998  | Horwood et al. ........... 119/57.4 |
| 5,941,193 | A | * | 8/1999  | Cole ........................... 119/57.4 |

FOREIGN PATENT DOCUMENTS

| BE | 1001219 | 8/1989  |
| EP | 0421533 | 10/1991 |
| EP | 0483963 | 5/1992  |
| EP | 0626133 | 11/1994 |

OTHER PUBLICATIONS

Search Report dated Dec. 22, 2005 for NL 1030743.
PCT Search Report dated Jul. 11, 2006.

* cited by examiner

*Primary Examiner* — Monica Williams
*Assistant Examiner* — Joshua Huson
(74) *Attorney, Agent, or Firm* — Thomas|Horstemeyer, LLP

(57) ABSTRACT

Feed dispenser for feeding birds, comprising a dispenser tray (1) having a center section (2) which is raised relative to the bottom surface (3). The raised center section interacts with a downpipe (7) in such a way that a supplied volume of feed (8) is distributed over the bottom surface of the dispenser tray. The center section of the dispenser tray is joined to the bottom surface which blends into a rising outwardly directed side wall (4). The side wall ends in an outer edge. The dispenser tray comprises at least two steep wall sections in the side wall at different height levels relative to the bottom surface. The steep wall sections extend in a direction parallel to the outer edge. In the vertical direction, the side wall has a top (4c) and a bottom half (4d). The bottom half comprises at least two steep wall sections.

17 Claims, 8 Drawing Sheets

US 8,381,683 B2

DISPENSER TRAY FOR FEED DISPENSER

CROSS-REFERENCE TO RELATED APPLICATION

This application is the National Stage of International Application no. PCT/IB2006/003743 filed Dec. 21, 2006, which claims the benefit of Netherlands patent application number 1030743 filed Dec. 22, 2005, the contents of which are incorporated by reference herein.

FIELD OF THE INVENTION

The present invention relates to a feed dispenser for feeding birds, comprising a dispenser tray having a centre section which is raised relative to a bottom surface and interacts with a downpipe in such a way that a supplied volume of feed from the downpipe is distributed over the bottom surface of the dispenser tray, the centre section of the dispenser tray being joined to the bottom surface which blends into an at least partially rising outwardly directed side wall, the side wall blending into an outer edge.

Furthermore, the invention relates to a dispenser tray and a feed distribution system comprising feed dispensers with dispenser trays.

BACKGROUND OF THE INVENTION

Such feed dispensers are for example known from EP-0421553, BE-08701293, EP-0626133 or EP-0483963. EP-0421553 shows a feed dispenser which is intended to provide feed for birds roaming freely inside a space in breeding farms. A complete feed distribution system generally comprises a storage device for a large volume of feed and a pipe conveyor system in which typically large numbers of feed dispensers are arranged at regular intervals along feed conveyor pipes. In this way, feed can be transferred from the storage device to various feed points. The feed conveyor pipes are generally arranged at a fixed distance with respect to one another within the space.

The feed dispenser illustrated has a dish-shaped pan on which the feed is offered to the birds. The dish-shaped pan has a raised outer edge. The outer edge of the dish-shaped pan is attached to a snap ring of a grating with the aid of a click-fit connection. The grating comprises a number of curved bars. The space between the bars forms a feeding position and offers the birds access to the feed in the dish-shaped pan. A conical centre section of the dish-shaped pan interacts with a downpipe which is situated above the centre section. There is an opening between the downpipe and the conical centre section of the dish-shaped pan through which the feed is conveyed from the feed conveyor pipe via the downpipe into the dish-shaped pan. In this manner, the feed is distributed evenly over the dish-shaped pan. In many cases, the feed is in powder form or granule form and contains a mixture of ingredients.

A drawback of the known feed dispenser is that the birds are able to sift various ingredients from the feed. For good growth and resistance against disease, it is important that the birds are fed a balanced mixture of ingredients. However, when various ingredients are offered to the birds at the same time in a mixture, the birds will have a preference for certain ingredients. The ingredients which are valued less are taken from the feed mixture and moved. This sifting out is observed particularly with laying-hens.

As a result of this sifting out, the birds will eat less diverse feed which is disadvantageous for the growth of the birds. This will lead to differences with regard to growth within the group of birds as not every animal receives feed of identical composition. Some animals will grow more quickly than others as these animals have a preference for growth-enhancing ingredients contained in the feed mixture. As a result of sifting the feed, the growth of other animals will lag behind. Consequently, the growth of the animals is not uniform throughout the entire group of birds.

In addition, sifting through the feed leads to more differences within the group of birds, such as differences in the state of health and the quality of the eggs. It will be clear that sifting is a phenomenon which is undesirable for a breeder.

During sifting, the ingredients from the feed mixture are removed from the opening between the downpipe and the conical centre section of the dish-shaped pan, so that fresh feed falls onto the dish-shaped pan again. The ingredients which are less popular with the birds accumulate as a result of the feed which is offered in the dish-shaped pan being moved to the outermost peripheral edge near the peripheral edge of the dish-shaped pan.

The displaced feed then presents a second disadvantage. The feed which is close to the peripheral edge of the dish-shaped pan is spilled over the peripheral edge more quickly. Spilled feed usually falls through a grating and is thus no longer eaten, resulting in economic damage to the breeding farm. In addition, the spilled feed forms a possible source of moulds and bacteria. Spilled feed is no longer fresh and may, if this is still eaten by the birds, negatively affect the well-being of the animal.

SUMMARY OF THE INVENTION

It is an object of the present invention to at least partly eliminate the abovementioned disadvantages and/or to provide a usable alternative. In particular, it is an object of the invention to provide a feed dispenser which prevents the birds from sifting out ingredients from the feed mixture offered.

This object is achieved with a feed dispenser for feeding birds according to the present invention.

The feed dispenser for feeding birds comprises a dispenser tray having a centre section which is raised relative to the bottom surface. The raised centre section interacts with a downpipe in such a way that a supplied volume of feed is distributed over the bottom surface of the dispenser tray. The centre section is joined to the bottom surface which blends into an at least partially rising outwardly directed side wall. The side wall blends into an outer edge.

The feed dispenser also comprises at least three steep wall sections in a stepped shape which extend in the peripheral direction of the side wall in such a way that the steep wall sections form an obstacle for the birds against moving feed. The at least three steep wall sections are provided in the side wall of the feed dispenser at different height levels relative to the bottom surface in a relevant area. The relevant area has a lower limit which substantially corresponds to a minimum intended height level of the feed in the dispenser tray. Preferably the lower limit of the relevant area corresponds to the height level of edges of a discharge opening for the feed in the downpipe relative to the dispenser tray. With this, a tangent line to a steep wall section in the side wall in a cross section along the centre axis of the dispenser tray through the steep wall section is at an angle α of 0° to 50° relative to a centre axis through the centre section of the dispenser tray.

Advantageously, the presence of the steep wall sections impedes the sifting out of ingredients from the supplied volume of feed. One steep wall section is preferably situated at a height level just above or adjoining the feed at the bottom of the dispensing tray. The steep wall sections serve as an obstacle. The birds have to take the sifted-out feed over the steep wall section in order to be able to move it. Thus, it is made impossible and/or more difficult for the birds to sift out feed.

If birds still sift out certain ingredients from the feed offered and move them to a section of the side wall near the outer edge, the moved feed will mix more quickly with the feed at the bottom of the dispenser tray due to the presence of the steep wall sections. Initially, the moved volume of feed is separated from the feed at the bottom of the dispenser tray as a result of the steep wall section extending in a direction substantially parallel to the outer edge. While eating the feed, the birds repeatedly hit the dispenser tray. This results in the moved volume of feed on the side wall sliding and falling from the steep wall section onto the feed which is at the bottom of the dispenser tray. Thus, the steep wall section ensures that the feed offered stays together better at the bottom of the dispenser tray. It is spread over the entire side wall of the dispenser tray to a lesser extent. As the feed returns relatively easily to the feed offered in the dispenser tray, it is more difficult for the birds to sift through the feed offered.

Preventing sifting and reducing spillage of feed results in appreciable cost savings. Tests have shown that the dispenser tray according to the invention can reduce feed spillage by more than 30%, enabling a substantial saving in the cost of feed. In addition, hygiene in the space where the birds are kept is improved.

The at least three, in particular at least five, steep wall sections in the side wall at several height levels provide the advantage that the volume of the moved feed is prevented from becoming excessively large. When the volume of the moved feed becomes excessively large, it will not, or hardly, slide to the bottom surface as a result of the birds hitting the dispenser tray and sifting out feed is thus counteractively less effectively.

In an embodiment, seen in the vertical direction, the side wall has a top and a bottom part, of which the bottom part comprises at least two steep wall sections.

The outer edge of the dispenser tray is preferably a vertical upright wall, the end of which is flanged and which is provided with fastening means for other components of the feed dispenser. The vertical upright wall further prevents spillage of feed from the dispenser tray. The flanged edge makes the outer edge less sharp for the birds which bend over the outer edge in order to reach the feed.

The side wall comprises a top and a bottom half. According to the invention, in the bottom half of the side wall, the side wall comprises at least two steep wall sections at different height levels relative to the bottom surface. The steep wall sections are particularly effective against sifting out feed when they are located in the bottom half of the side wall of the dispenser tray, as, generally, the feed is offered in the bottom half of the dispenser tray on the bottom surface. At least two steep wall sections are advantageous when the feed dispenser has an adjustable downpipe. By adjusting the downpipe, the feed can be offered at different height levels in the dispenser tray. As a rule, two settings are used. As a result of the adjustment, one of the steep wall sections in the side wall may be situated below the height level of the supplied volume of feed in the dispenser tray, thus not preventing sifting out. It is therefore expedient if steep wall sections are present at two height levels, so that a steep wall section is effective at each height level of the feed which can be selected.

In one particular embodiment, a substantially flat wall section which is joined to a steep wall section in the side wall of the dispenser tray adjoins the outer edge. At least one steep wall section is arranged at a different height level in the side wall. In this case, it is advantageous that the sifted-out feed near the outer edge is returned to the feed which is at the bottom of the dispenser tray. The feed which is closest to the outer edge is spilled over the outer edge first. Therefore, it is advantageous if this feed near the outer edge is carried away through the presence of a steep wall section in the side wall of the dispenser tray.

In one particular embodiment, the side wall of the dispenser tray according to the invention does not comprise a steep wall section in the top half of the side wall. The presence of the steep wall sections in the side wall of the dispenser tray partly determines the height of the dispenser tray. The advantage of this embodiment is that the height of the dispenser tray is limited. This makes this embodiment particularly suitable for relatively small birds, such as quails and chicks of laying-hens. Depending on the use, the geometry of the dispenser tray can be matched to the different sizes of the birds, such as they occur with turkeys, chickens and quails, by varying the number of steep wall sections.

In another particular embodiment, the steep wall section in the side wall is substantially continuous in the peripheral direction of the side wall. As a result of the substantially continuous, uninterrupted steep wall section, the dispenser tray has relatively few corners and edges. Advantageously, this prevents soiling of the dispenser tray. The advantageous effect is already achieved by a steep wall section which is partially continuous in the peripheral direction of the side wall, the steep wall section at least extending over a length of approximately one feeding position. The advantageous effect is achieved to a substantial degree by a steep wall section which is partially continuous in the peripheral direction of the side wall, the steep wall section at least extending over a length of approximately one third of the peripheral length of the side wall.

In many cases, the shape of the dispenser trays is round or oval. If a die is used during manufacturing, it is expedient if the steep wall section is not interrupted in the peripheral direction. This allows the die to be produced with fewer processing steps and thus cover associated costs.

Further preferred embodiments of the feed dispenser are defined in the other subclaims.

Furthermore, the invention relates to a dispenser tray and a feed distribution system.

BRIEF DESCRIPTION OF THE DRAWINGS

The invention will be explained in more detail with reference to the attached drawings which show a practical embodiment of the invention, but which should not be regarded as being limiting in any sense, in which.

DESCRIPTION OF THE PREFERRED EMBODIMENTS

Figure 1:
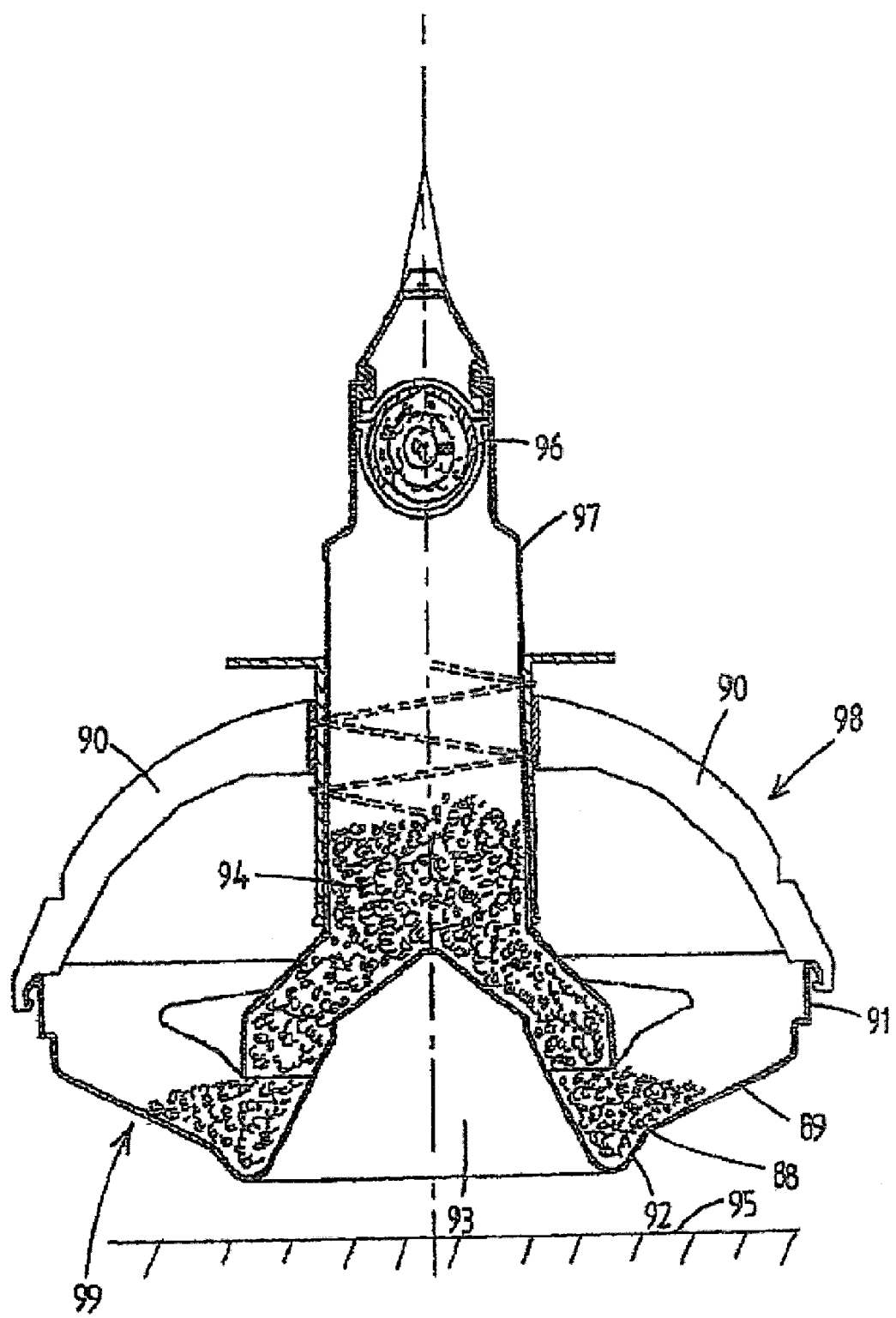
FIG. 1 shows a cross section in side view of a feed dispenser filled with feed according to the state of the art.

FIG. 1 shows a feed dispenser as known from the state of the art having a round dish-shaped pan 99 which is suspended from a feed conveyor pipe 96 above the ground 95 with the aid of a grating 98 and a downpipe 97. The dish-shaped pan 99 is filled with feed 94. The dish-shaped pan 99 has a conical centre section 93 which interacts with a conical section of the downpipe 97 in such a manner that an opening is created through which the feed 94 can move to the bottom section of the dish-shaped pan 99. The downpipe 97 can be adjusted so that the feed can be offered at different height levels in the dish-shaped pan 99. The conical centre section 93 joins onto a bottom surface 92 which forms a groove in the bottom of the dish-shaped pan 99. Dish-shaped pans which are used for laying-hens generally have a groove-shaped bottom surface, the groove having a depth of up to four centimeters. The groove-shaped bottom surface 92 of the dish-shaped pan 99 blends into a side wall 89, which is rising and ends in an outer edge 91, via a curve 88.

In FIG. 1 the outer edge 91 is circular. At the location of the outer edge 91, the dish-shaped pan 99 is attached to the grating 98 by means of a click-fit connection. The grating 98 has bars 90. The space between the bars 90 forms a feeding position and gives the birds access to the feed 94 at the bottom of the dish-shaped pan 99.

Figure 2:
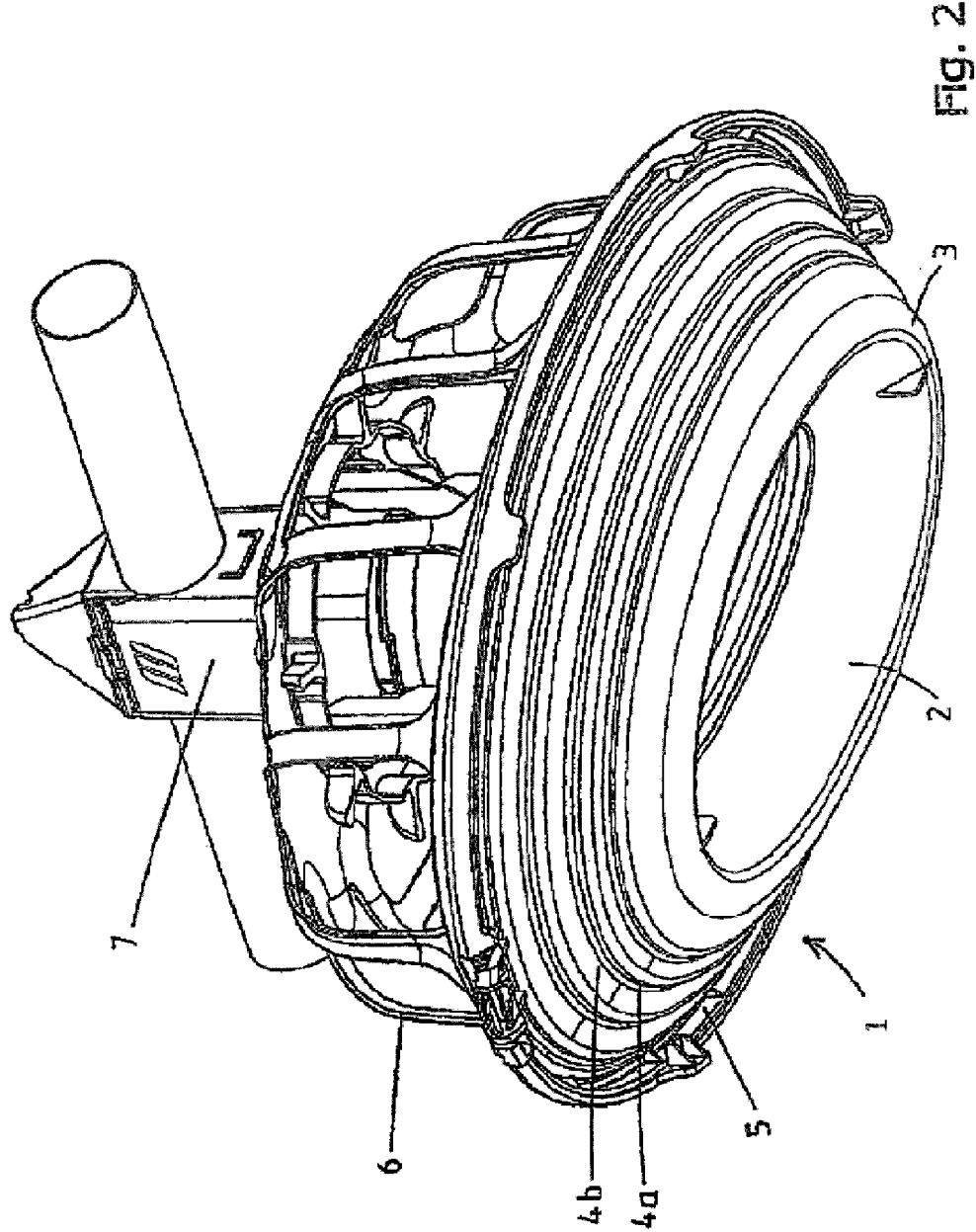
FIG. 2 shows a perspective view of the feed dispenser according to the invention.

FIG. 2 shows a perspective view of a feed dispenser according to the invention. The feed dispenser in FIG. 2 is shown from the bottom. The dispenser tray 1 having a centre section 2, which in this case is of conical design, a bottom surface 3 and a side wall 4 comprising steep wall sections 4a and substantially flat wall sections 4b in a stepped shape can clearly be seen. The side wall 4 rises obliquely and blends into an outer edge 5. The dispenser tray 1 is attached to a grating 6 with bars and a downpipe 7. FIG. 2 shows that the steep wall sections 4a are continuous and run parallel to the outer edge 5.

Figure 3:
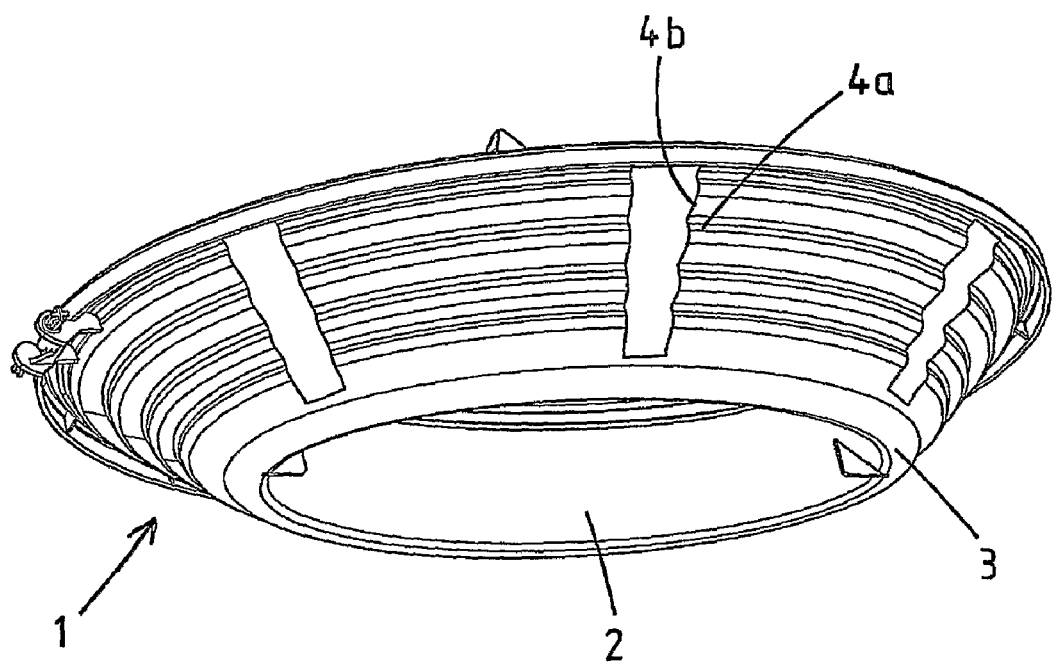
FIG. 3 shows a bottom view in perspective of the dispenser tray according to the invention.

FIG. 3 shows a bottom view in perspective of the dispenser tray 1. The steep wall sections 4a are partially continuous in the peripheral direction of the side wall, the steep wall section at least extending over a length of at least two feeding positions.

Figure 4:
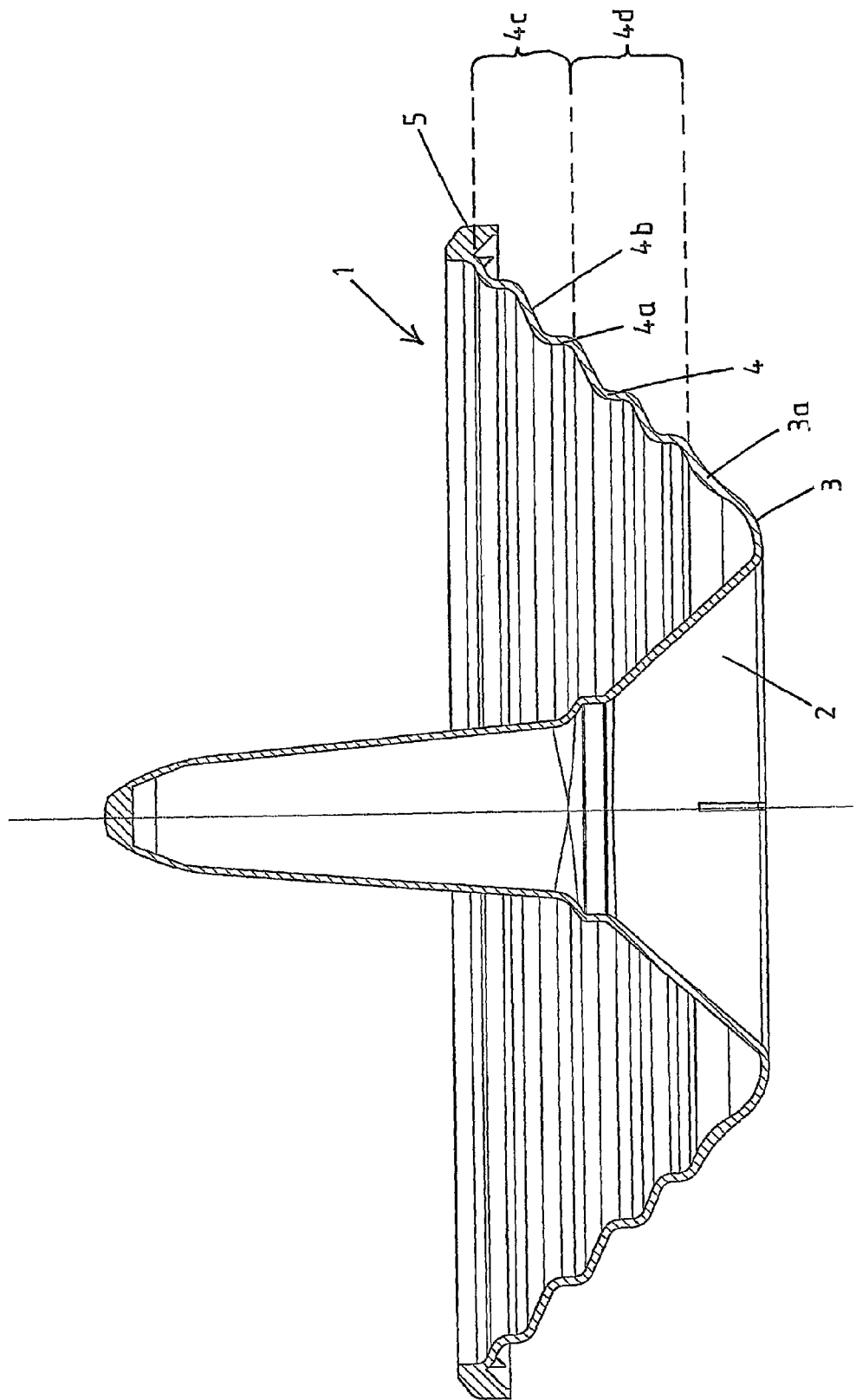
FIG. 4 shows a side view in cross section of the dispenser tray from FIG. 3 having some steep wall sections in the side wall.

FIG. 4 shows a side view in cross section of the dispenser tray 1. The dispenser tray 1 has a centre section 2 which in this case is of conical design. The centre section 2 blends into a bottom surface 3 and into a side wall 4 via a curve 3a. The side wall 4 rises obliquely and blends into an outer edge 5. In the vertical direction, the side wall 4 has a top half 4c and a bottom half 4d. The side wall 4 has four steep wall sections 4a and substantially flat wall sections 4b.

The bottom surface 3 is groove-shaped and blends into the side wall 4 via the curve 3a. The curve 3a in this case is within a radius of 150 mm measured from the centre axis of the dispenser tray. The curve 3a is substantially parallel to the outer edge 5 at a distance of at least 30 mm, measured at right angles to the centre axis of the dispenser tray. These dimensions create a distance between the supplied volume of feed and the outer edge 5 so as to prevent spilling of feed. Using these dimensions, the illustrated dispenser tray is particularly suitable for feeding laying-hens.

The steep wall section bridges a difference in height of at least 2 mm. Advantageously, the steep wall section thus separates the offered feed and the moved feed in the dispenser tray in different volumes as a result of the fact that the difference in height is relative to the grain size of the feed mixture. As the grain size of the feed is generally less than 2 mm, the difference in height which has to be bridged by the steep wall section is preferably larger than 2 mm. This difference in height results in an adequate separation between the moved feed and the feed offered at the bottom of the dispenser tray. The moved feed will slide in the direction of the centre section of the dispenser tray as a result of the birds hitting the dispenser tray. As a result of the difference in height, the moved feed, at the location of the steep wall section, will fall onto the feed at the bottom of the steep wall section. Thus, the feed volume at the bottom of the dispenser tray remains compact and both the sifting out of feed and the spilling of feed over the outer edge are effectively prevented.

Figure 5:
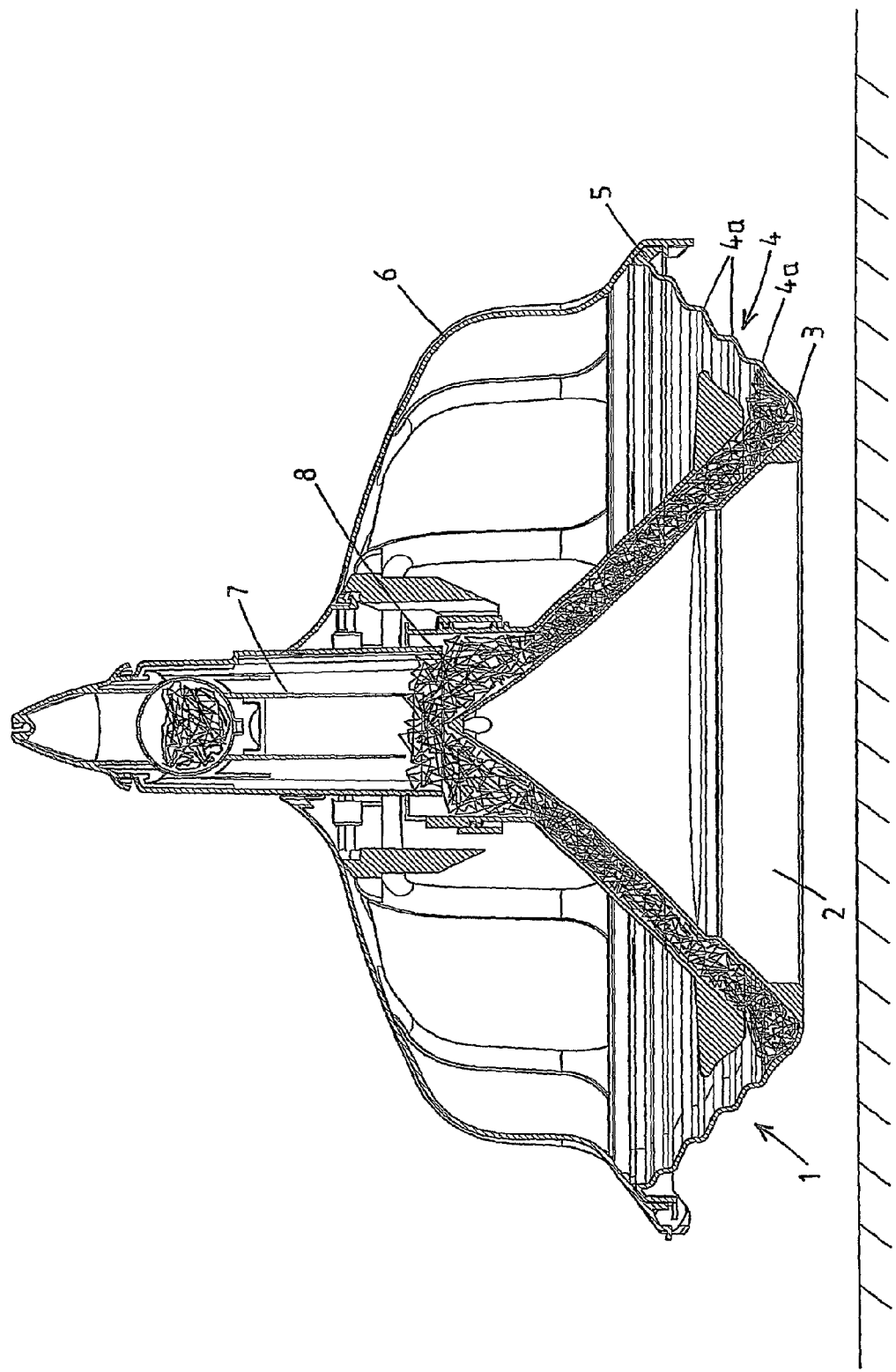
FIG. 5 shows a side view in cross section of the dispenser tray according to the invention having a regular distribution of steep wall sections over the side wall.

FIG. 5 shows a feed dispenser according to the invention in cross section. The dispenser tray 1 has a conical centre section 2 which blends into a groove-shaped bottom surface 3 which, via a flowing curve 3a, blends into a side wall 4 which ends in an outer edge 5. The side wall 4 rises and, at several height levels relative to the bottom surface 3, has steep wall sections 4a and substantially flat wall sections 4b.

The supplied volume of feed 8 will initially be located at the bottom of the dispenser tray 1 at the level of the groove-shaped bottom surface 3. The feed 8 consists of a mixture of ingredients. The height setting of the downpipe 7 determines the amount of feed 8 which flows from a discharge opening of the downpipe into the bottom of the dispenser tray. The feed will generally come to lie against the side wall up to an intended height level. As a rule, this height level is substantially equal to the height level of the edges of the discharge opening of the downpipe. This height level forms a lower limit for a relevant area in which the steep wall sections can effectively be arranged. The upper limit for the relevant area is formed by the outer edge of the dispenser tray.

If the downpipe can be set at different height levels, the maximum lower position of the downpipe determines the relevant area in the side wall regarding the presence of steep wall sections. The feed will come to lie against the side wall up to an intended minimum height level. The area in the side wall which is above the height level of the discharge opening in the maximum lower position of the downpipe is relevant for attaching steep wall sections.

If the discharge opening of the downpipe can be adjusted in a stepped manner to certain height levels, the side wall preferably has steep wall sections at substantially identical height levels. As a result, the steep wall sections are advantageously positioned such that they extend just above the height level of the feed at each setting of the downpipe and thus effectively prevent sifting out and spilling of feed.

The steep wall section 4a which adjoins the feed 8 does form an obstacle preventing the sifting out of the mixture. However, the birds will be able to sift out and move certain ingredients of the mixture of the supplied feed, leading to a volume of moved feed on a substantially flat wall section 4b which is located at higher level in the side wall 4. The volume of moved feed is thus separated from the supplied volume of feed at the bottom of the dispenser tray 1. As a result of the birds hitting the outer edge 5 of the dispenser tray 1, the volume of moved feed will slide from a substantially flat wall section 4b in the side wall 4 to a lower, substantially flat wall section 4b until the volume of moved feed has again been added to the volume of feed at the bottom of the dispenser tray 1. Thus, the sifting out and spilling of feed is advantageously reduced. The steep wall sections 4a are distributed over the side wall 4 at substantially regular intervals relative to one another. Furthermore, the vertical and horizontal dimensions of each steep wall section 4a and substantially flat wall section 4b are substantially identical, thus resulting in a simple design.

In FIG. 5, the entire side wall 4 is provided with steep wall sections 4a and substantially flat wall sections 4b, so that the entire side wall 4 is effectively used to help prevent sifting out certain ingredients from the supplied feed.

Figure 6:
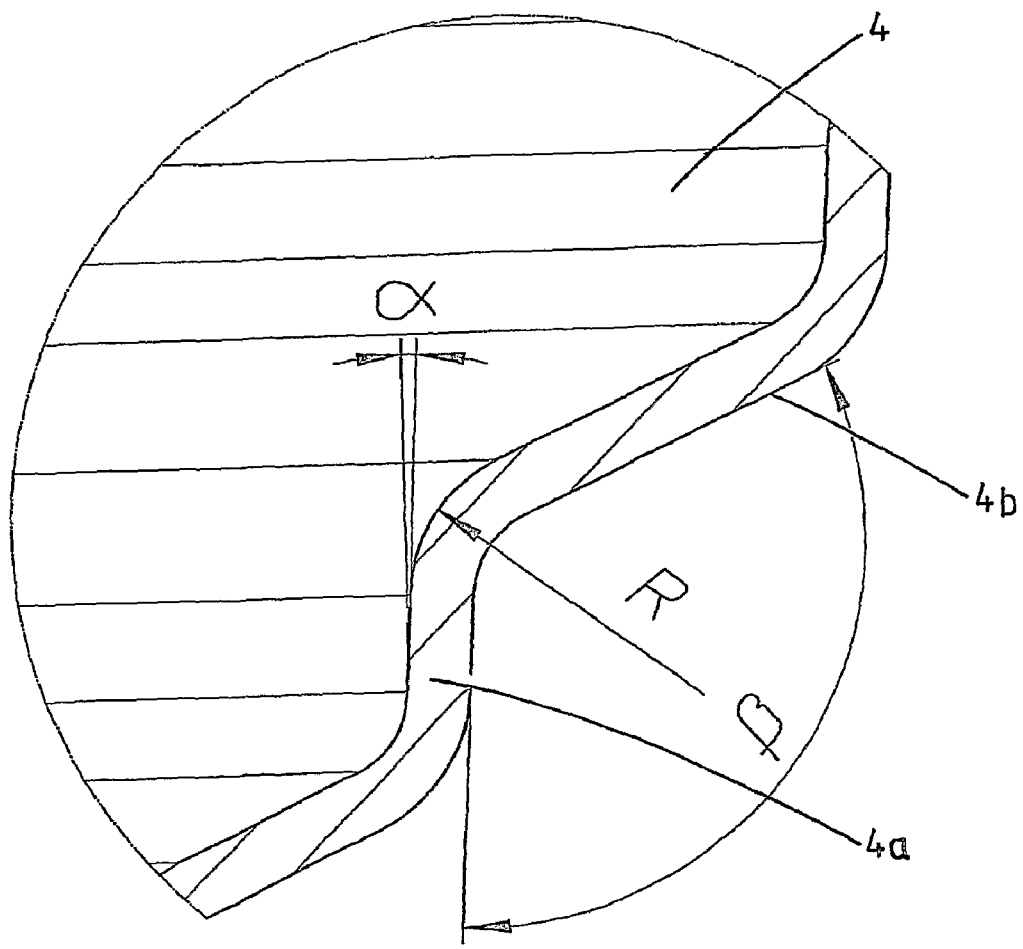
FIG. 6 shows an enlarged detail from FIG. 5 of the side wall of the dispenser tray.

FIG. 6 shows an enlarged detail of the side wall 4 from FIG. 5 with a steep wall section 4a and a substantially flat wall section 4b therein. It is possible for a moved volume of feed to remain behind on the substantially flat wall section 4b. The steep wall section 4a blends into the substantially flat wall section 4b via a radius R. The steep wall section 4a is substantially vertical. A tangent line to the steep wall section 4a forms an angle α relative to a vertical line parallel to the centre axis of the dispenser tray 1. Preferably, the angle α is between 0°-50°, more preferably the angle α has a value of at least 0° and at most 15°. Using a small angle α of, for example, 3°, a good release angle is obtained in case the dispenser tray 1 is manufactured using a die. The substantially flat wall section 4b is at an angle β relative to the tangent line to the steep wall section 4a.

Preferably, the substantially flat wall section 4b which is joined to the steep wall section 4a at an angle β of 90°-145° relative to the steep wall section 4a. In a particularly advantageous embodiment, the wall section which blends into the vertical wall section is at an angle β of approximately 120° relative to the vertical wall section. It has been found that at this angle good results are achieved in respect of preventing sifting out. As a result of a slight slope in the substantially flat wall section, the moved feed slides more easily in the direction of the centre section of the dispenser tray.

Preferably, a substantially flat wall section 4b which is joined to a steep wall section 4a in the side wall of the dispenser tray 1 is at an angle relative to the horizontal of 0° to 30°.

Figure 7:
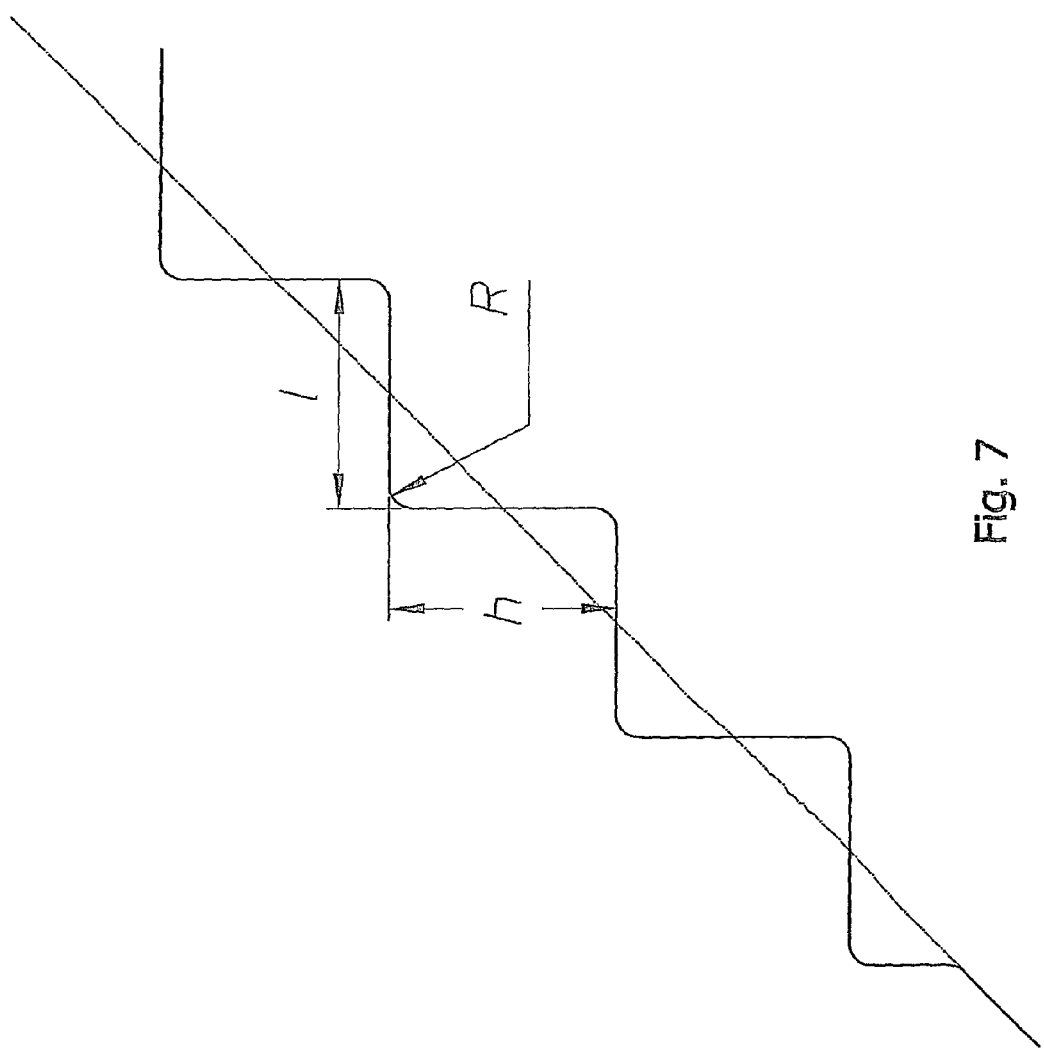
FIG. 7 schematically shows an alternative in an enlarged detail as in FIG. 6.
Figure 8:
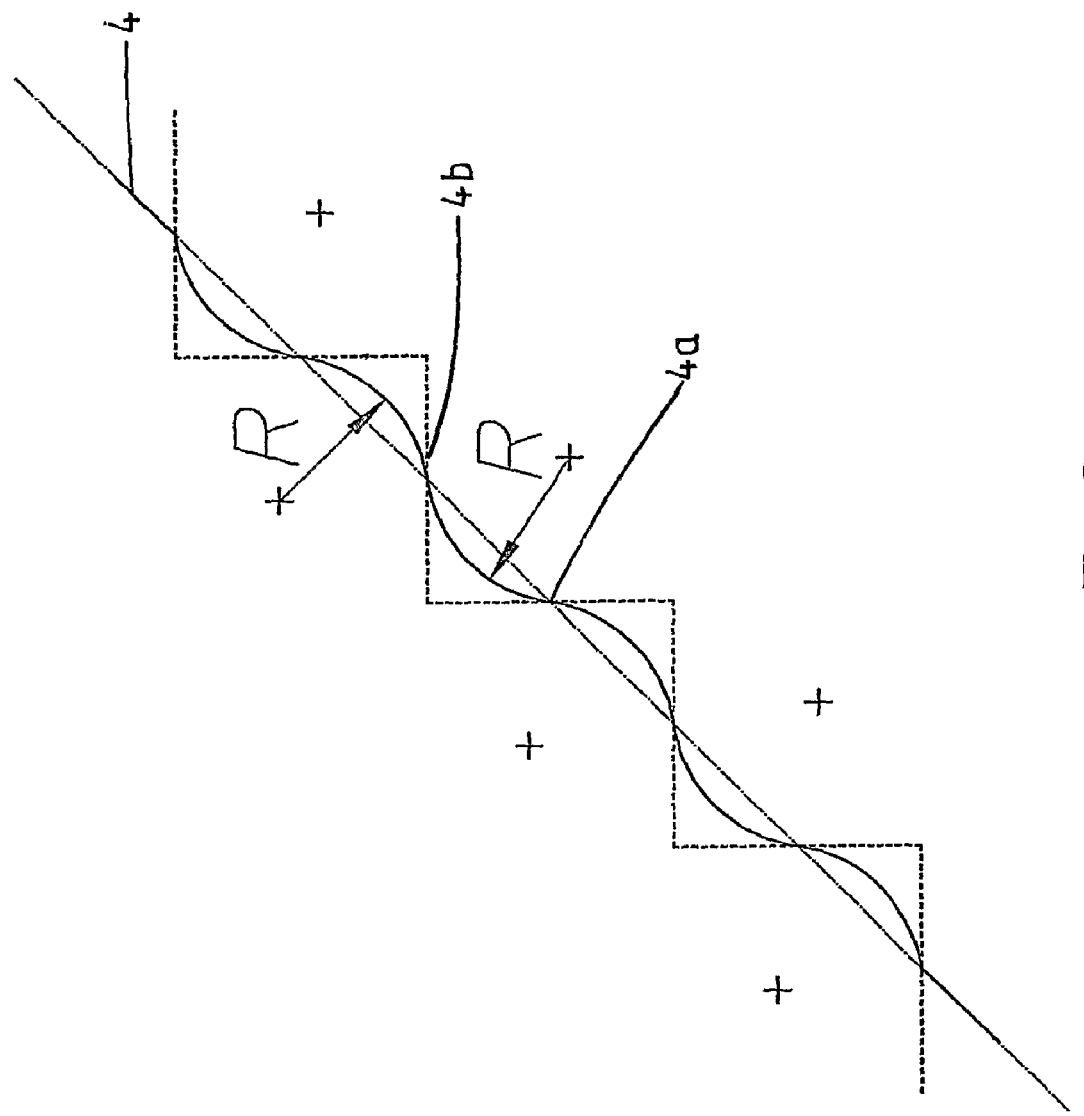
FIG. 8 schematically shows an alternative in an enlarged detail as in FIG. 6.

FIGS. 7 and 8 schematically show various alternatives for the steep wall sections 4a and substantially flat wall sections 4b in the side wall 4 of the dispenser tray 1. FIG. 7 shows a stepped design, in which the steep wall sections 4a are substantially vertical and the substantially flat wall sections 4b are substantially horizontal. The height h and length l dimensions of the steep and substantially flat wall sections 4b, respectively, are in this case substantially identical to one another. The steep wall section 4a blends into a substantially flat wall section 4b via a small radius R which is substantially identical to the thickness of the side wall 4. The substantially flat wall sections 4b in the side wall 4 have a length l in a direction at right angles to the centre axis of at least 2 mm.

FIG. 8 shows a variant embodiment for the stepped design as illustrated in FIG. 7. The steep wall sections 4a, via a radius R, blend smoothly into a substantially flat wall section 4b. In FIG. 8, the side wall 4 has no straight sections or angles. This advantageously prevents feed from remaining behind in the corners. The absence of edges and corners prevents the dispenser tray 1 from soiling quickly.

Many variants are possible in addition to the embodiments shown in the figures. In one variant on the dispenser tray illustrated, the outer edge of the dispenser tray can have an arbitrary shape. Thus, the outer edge may be circular, oval with straight sides, elliptical, rectangular with rounded corners, hexagonal, trefoiled, etc. The steep wall sections in the side wall are generally substantially parallel to the outer edge. The illustrated steep wall sections run at least partially continuously in the peripheral direction of the side wall. The steep wall sections may be interrupted at random locations. The steep wall sections may also be interrupted at a random number of locations. In one variant, for example, the total length of the individual steep wall sections at a height level may be at least half the length of the side wall in the peripheral direction on the height level of the steep wall sections. In one variant, the steep wall sections in the side wall may have various height dimensions. By means of the substantially flat wall sections in the side wall, a desired geometry of the dispenser tray is achieved. The substantially flat wall sections may, however, also be designed in a different way from that shown, for example, curved, concave or convex.

In the embodiment shown, the steep wall sections are integrated into the side wall of the dispenser tray. The side wall of the dispenser tray is made in one piece. However, it is also possible to mount components on the side wall of the dispenser tray in such a manner that steep wall sections in the side wall of the dispenser tray are created.

In one variant of the illustrated integrally formed dispenser tray, the dispenser tray may be composed of several parts. In a further variant of this embodiment, a section of the dispenser tray may be integrated in the grating with bars which is generally attached to the outer edge of the dispenser tray as a separate component. The steep wall sections may then also be incorporated in the separate component which the grating with bars forms and which also partly serves as part of the dispenser tray.

In a particular variant according to the invention, the dispenser tray may be designed such that the height level of the feed is relatively high compared to the total height of the side wall. The desired height level of the feed may, for example, also reach up to or above half the height of the side wall. At least two steep wall sections are in that case provided in a relevant area which has a lower limit which substantially corresponds to the desired height level of the feed.

Furthermore, it has already proved to be advantageous to provide a dispenser tray with at least two steep wall sections in the side wall, in which the bottom half is free from steep wall sections or in which only one steep wall section is incorporated in the bottom half of the side wall. The steep wall sections in the top half of the side wall make a positive contribution with regard to preventing sifting out of feed.

Thus, the dispenser tray in the feed dispenser according to the invention provides a feed dispenser which prevents the sifting of a feed mixture and furthermore counteracts the spilling of feed outside the feed dispenser.

What is claimed is:

1. Feed dispenser for feeding birds, comprising
a dispenser tray having a center section which is raised relative to a bottom surface and interacts with a downpipe in such a way that a supplied volume of feed from the downpipe is distributed over the bottom surface of the dispenser tray, the downpipe having a discharge opening with edges, the center section of the dispenser tray being joined to the bottom surface which blends into an outwardly directed side wall that rises obliquely from the bottom surface, the side wall blending into an outer edge, the side wall comprising, at different height levels relative to the bottom surface in the side wall in a relevant area which has a lower limit which substantially corresponds to a minimum intended height level of the feed in the dispenser tray, in which the lower limit of the relevant area corresponds to the height level of said edges of the discharge opening for the feed in the downpipe relative to the dispenser tray, at least three steep wall sections in a stepped shape which extend in the peripheral direction of the side wall in such a way that the steep wall sections form an obstacle for the birds against moving feed, in which a tangent line to a steep wall section in the side wall in a cross section along a center axis of the dispenser tray through the steep wall section is at an angle a of between 0° to 50° relative to a vertical line parallel to the center axis through the center section of the dispenser tray, wherein the obliquely rising side wall has a slight slope, and, wherein the downpipe is adjustable in a stepped manner to certain height levels relative to the dispenser tray, in which the steep wall sections in the sidewall are arranged at height levels which are substantially identical to the height levels of the edges of the discharge opening of the downpipe such that the steep wall sections correspond to the level of feed being dispensed at each setting.

2. Feed dispenser according to claim 1, in which the upper limit of the relevant area in the side wall corresponds to the outer edge of the dispenser tray.

3. Feed dispenser according to claim 1, in which the relevant area has an upper limit which is 1 cm below the outer edge of the dispenser tray.

4. Feed dispenser according to claim 1, in which the side wall of the dispenser tray comprises a top part and a bottom part, the bottom part of the side wall, comprises at least two steep wall sections in the side wall which extend in the peripheral direction of the side wall at different height levels relative to the bottom surface, in such a manner that the steep wall sections form an obstacle for the birds against moving feed.

5. Feed dispenser according to claim 1, in which the side wall of the dispenser tray comprises a top part and a bottom part and in which at least one steep wall section is situated in the bottom part of the side wall.

6. Feed dispenser according to claim 1, in which the side wall of the dispenser tray comprises a top part and a bottom part and in which there is at least one steep wall section in each of the top part and the bottom part of the side wall.

7. Feed dispenser according to claim 1, in which a substantially flat wall section which is joined to the steep wall section in the side wall of the dispenser tray adjoins the outer edge, in which a tangent line to the substantially flat wall section which is joined to a steep wall section in the side wall of the dispenser tray is at an angle β of 90° to 145° relative to the tangent line to the adjoining steep wall section.

8. Feed dispenser according to claim 1, in which the side wall of the dispenser tray comprises at least five steep wall sections.

9. Feed dispenser according to claim 1, in which the steep wall sections in the side wall of the dispenser tray are substantially continuous in the peripheral direction of the side wall.

10. Feed dispenser according to claim 1, in which the bottom surface of the dispenser tray is groove-shaped and blends into the side wall via a curve.

11. Feed dispenser according to claim 1, in which the bottom surface of the dispenser tray blends into the side wall via a curve, which curve is substantially parallel at a distance of at least 30 mm measured from the outer edge at right angles to the centre axis of the dispenser tray.

12. Feed dispenser according to claim 1, in which the steep wall sections in the side wall of the dispenser tray are distributed over the side wall at substantially regular intervals in the vertical direction.

13. Feed dispenser according to claim 1, in which the steep wall sections in the side wall of the dispenser tray have a height (h) of at least 2 mm.

14. Feed dispenser according to claim 1, in which the angle α has a value of at least 0° and at most 15°.

15. Feed dispenser according to claim 1, in which a substantially flat wall section which is joined to a steep wall section in the side wall of the dispenser tray is at an angle relative to the horizontal of 0° to 30°.

16. Dispenser tray intended for a feed dispenser according to claim 1.

17. A feed distribution system comprising a plurality of feed dispensers according to claim 1.

* * * * *

UNITED STATES PATENT AND TRADEMARK OFFICE
CERTIFICATE OF CORRECTION

PATENT NO.       : 8,381,683 B2                                                     Page 1 of 1
APPLICATION NO. : 12/158531
DATED            : February 26, 2013
INVENTOR(S)      : Keirse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 270 days.

Signed and Sealed this
First Day of September, 2015

Michelle K. Lee
*Director of the United States Patent and Trademark Office*